Aug. 11, 1942.  D. E. PRIEST  2,292,657
SCREW HOLDER
Filed May 24, 1940
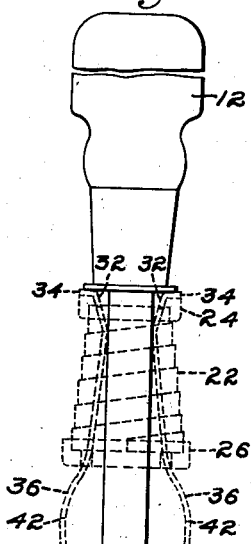
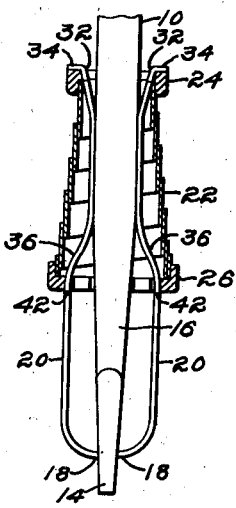
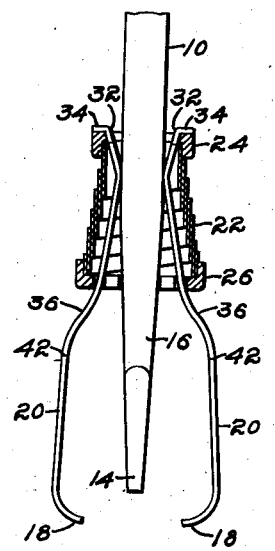
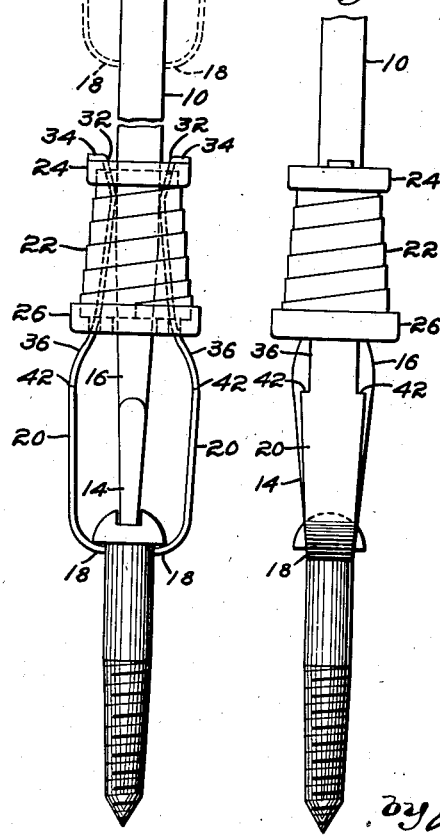
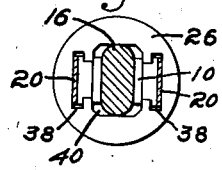
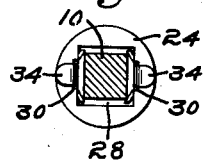
Inventor:
Dwight E. Priest,
Attys.

Patented Aug. 11, 1942

2,292,657

UNITED STATES PATENT OFFICE 2,292,657

SCREW HOLDER

Dwight E. Priest, Worcester, Mass., assignor to Parker Wire Goods Company, Worcester, Mass., a corporation of Massachusetts Application May 24, 1940, Serial No. 337,003

1 Claim. (Cl. 145—52)

This invention relates to screw holders, that is to say, a device for use with a screw driver to hold a screw engaged with the edge of the blade thereof, usually for use during the initial stages of driving or later stages of withdrawing the screw. The object of the invention is to provide an effective and neat device of this description embodying few and simple parts and which it is easy to manufacture and assemble.

While various features of my invention may be embodied in holders of widely differing form, the one which I have illustrated in the accompanying drawing by way of example embodies principles of construction described in the patent to Fegley and Leopold, No. 864,633, Aug. 27, 1907, and thus in certain of its more specific aspects my invention may be considered as an improvement on the device of that patent.

The invention will be well understood by reference to the following description taken in connection with the accompanying drawing of the specific embodiment above referred to, wherein:

Fig. 1 is a view of a screw driver with screw holder holding a screw on the edge of the former in position to drive, with parts broken away;

Fig. 2 is a fragmentary view of the same as seen from the right of Fig. 1;

Fig. 3 is a central longitudinal section with the parts in idle position;

Fig. 4 is a view similar to Fig. 1 with the parts in a still different position; and Figs. 5 and 6 are sections of the screw driver above and below the compression spring.

For convenience in the following description I will use the word "rearwardly" as signifying away from the edge of the screw driver or toward the handle, the word "proximal" as signifying toward the handle, and the word "distal" as signifying toward the point.

Referring to the drawing, I have there shown an ordinary hand-operated screw driver having a shank 10, conveniently non-circular in section as seen in Figs. 5 and 6, and a handle 12 at its rear end. The point or edge of the tool may be formed on the blade portion 14 of conventional form having a portion laterally somewhat wider than the shank and thus constituting an example of a suitable construction providing enlargements 16 located rearwardly of the edge of the screw driver and serving as abutments, as will hereinafter appear. The screw is maintained on the edge of the tool, as shown in Figs. 1 and 2, by means of jaws 18 provided on the inturned ends of a pair of arms 20 of flat strip spring steel and which are secured to the proximal end of a compression spring 22 mounted to encircle the shank 10 of the screw driver and receiving support at its distal end from the enlargements 16. In the position of Figs. 1 and 2 the jaws are stressed rearwardly or upwardly in that figure, engaging beneath the head of the screw and holding it in position on the edge of the screw driver. If the screw is not present, the jaws are retracted beyond the edge of the screw driver, as illustrated in Fig. 3, so that the edge is then unobstructed. The entire mechanism may likewise be slid up the shank, as to the dotted line position of Fig. 1, out of the way when it is not desired to use it.

Herein the connection of the arms 20 to the spring 22 is made by means of a cup or disc 24 encircling the shank 10 and in or on which the spring 22 is seated, while the support of the distal end of the spring from the enlargements 16 may be effected by a similar cup or disc 26 normally resting on the rear side of the enlargements 16 is illustrated in full lines in the several figures. The proximal disc 24 here shown, as seen in Fig. 5, has an opening 28 to pass the shank and recesses 30 at either side thereof adapted to receive reduced end portions 32 (see Fig. 2) at the proximal ends of the arms 20 which are terminally bent to provide flange portions 34 extending radially outwardly from the shank and thus adapted to overlie the proximal face of the disc when the parts 32 are engaged in the recesses. As seen in Figs. 3 and 5, the shank of the screw driver lying in the opening 28 maintains the reduced portions 32 in the recesses with the opposed radial surfaces of the disc 24 and of the flanges 34 engaged so that the arms 20 cannot move forwardly axially of the shank independently of the disc.

The arms 20 may extend forwardly for a distance closely adjacent the shank and may then be provided with outwardly sloping portions 36 and then extend through slots 38 in the distal disc 26, which slots are formed radially outward of or remote from an opening 40 in that disc through which the shank of the screw driver passes and which for convenience may be made as the ends of T-shaped recesses extending from margins of opening 40, as seen in Fig. 6. The terminal portions of the arms distally of the disc 26 are made somewhat wider, as best seen in Fig. 2, providing the shoulders 42 adapted to overlie the margins of the slots 38 at the distal side of the disc, and, as already explained, the arms are terminally inturned to form the screw-engaging jaws 18. The stress of the spring 22 will normally maintain the disc 24 retracted, as shown in Fig. 3, with the shoulders 42 engaging the distal face of disc 26, thus in connection with the positioning of the proximal ends of the arms 20 by the shank of the screw driver, as already explained and as illustrated in Fig. 5, holding the parts in assembled relation. The portions of arms 20 rearward of shoulders 42 are of no greater width than the slot and in assembly the arms may thus be threaded through the slots from the distal side. Openings 28 and 40, as seen in Figs. 5 and 6 may correspond to the cross section of the blade so that the discs and the device as a whole may slide thereon but preferably not rotate so that the edges of the jaws 18 will always be parallel to the edge of the screw driver blade to move freely past the same.

Fig. 3 indicates what may be considered the normal position of the parts with the jaws 18 retracted somewhat rearwardly of the edge of the blade. If now the disc 24 is thrust forwardly compressing the spring 22, the arms 20 will be projected beyond the edge of the blade, and because the flaring portions 36 thereof ride in the slots 38 the jaws will be spread apart as illustrated in Fig. 4 to facilitate the introduction of the screw between the same. If the disc 24 is then released, the spring 22 will act to retract the jaws which collapse about the shank of the screw beneath the head and hold it engaged with the edge of the blade, as illustrated in Figs. 1 and 2. The screw may be released in similar manner and the edge of the blade will then be exposed as in Fig. 3 to permit its insertion in the screw slot as in the case of an ordinary screw driver, and the entire mechanism may be slid up the shank out of the way to or toward the dotted line position of Fig. 1.

The arms 20 may be preliminarily formed and then tempered. It will be noted that the assembly of the various parts is a mere collocation or sliding of the parts together and no mechanical operations on brittle, tempered members are required. The assembly is completed and made permanent by the insertion of the shank of the screw driver which locks the portions 32 in the recesses 30. This may be effected by slipping the assembled parts over the shank from the rear prior to the attachment of the handle 12.

An important feature of my invention is the form of the spring 22 which, as seen, encircles and encloses the arms 20 between the discs 24 and 26 between which the spring is interposed. This spring is a so-called volute spring, that is, it consists of a flat bar or ribbon coiled in a helix of a conical nature, in the example illustrated being simply conical and so corresponding to a single cone or frustum of a cone. The spires of the conical helix may telescope one within another when the spring is compressed. The spring is so coiled that the successive spires overlap and contact with one another or have but a slight radial clearance. Hence the spring at all times presents an exterior wall which may be considered as effectively continuous in the sense that it presents no major interstices into which any exterior object (the ends of the fingers of the operator, for example) might enter to be pinched or to cause fouling or jamming of the mechanism. The arms are enclosed and protected by the spring which thus in addition to its function as a spring serves as a housing and also gives a very neat appearance to the complete device.

I am aware that the invention may be embodied in other specific forms without departing from the spirit or essential attributes thereof, and I therefore desire the present embodiment to be considered in all respects as illustrative and not restrictive; reference being had to the appended claim rather than to the foregoing description to indicate the scope of the invention.

I claim:

A screw holder for mounting on the shank of a screw driver rearwardly of an enlargement thereof adjacent the driving edge and comprising a volute spring having closely arranged telescoping spires and arranged to receive support at its distal end from said enlargement, and arms mounted at the proximal end of the spring, extending forwardly within the compass of the same which thus provides a housing for the arms, and extending from such housing past the distal end of the spring and terminating in screw-engaging jaws.

DWIGHT E. PRIEST.